United States Patent [19]
Hunkar

[11] 3,712,772
[45] Jan. 23, 1973

[54] CONTROL SYSTEM FOR PARISON EXTRUDERS

[75] Inventor: Denes B. Hunkar, Cincinnati, Ohio

[73] Assignee: Hunkar Instrument Development Laboratories, Inc., Cincinnati, Ohio

[22] Filed: Sept. 23, 1970

[21] Appl. No.: 74,644

Related U.S. Application Data

[63] Continuation-in-part of Ser. No. 875,448, Nov. 10, 1969, abandoned.

[52] U.S. Cl. ................................425/141, 425/381
[51] Int. Cl. ..............................................B29f 3/00
[58] Field of Search........18/2 HA, 14 V, 14 R, 16 C, 18/5 BV; 235/151.11; 425/135, 141, 155, 381, 465, 466

[56] References Cited

UNITED STATES PATENTS

| | | | |
|---|---|---|---|
| 3,538,548 | 11/1970 | Tenner | 18/14 V |
| 3,368,241 | 2/1968 | Williams | 18/14 V |
| 3,597,794 | 8/1971 | Mann | 18/16 C |
| 2,864,010 | 12/1958 | Rosenberg et al. | 235/151.11 UX |
| 3,422,648 | 1/1969 | Lemelson | 18/14 V UX |
| 2,044,961 | 6/1936 | Waner | 18/14 V |
| 3,480,999 | 12/1969 | Carlo | 18/14 V X |

FOREIGN PATENTS OR APPLICATIONS

| | | | |
|---|---|---|---|
| 1,948,580 | 4/1970 | Germany | 425/466 |

Primary Examiner—J. Spencer Overholser
Assistant Examiner—Michael O. Sutton
Attorney—Wood, Herron and Evans

[57] ABSTRACT

An electronic control for a parison extruder. The system is effective to control either symmetrical or asymmetrical variations in parison wall thickness. The control system includes a matrix-type patch board in which the desired thickness is set up for each interval of the extrusion cycle. The patch board signals are scanned by an electronic timer and a transistor switching circuit so that a control signal is generated for each sequential interval of the extrusion cycle. These control signals are applied to a servo amplifier which in turn controls a servo valve for changing the relative position between a mandrel and die opening of the extruder.

33 Claims, 10 Drawing Figures

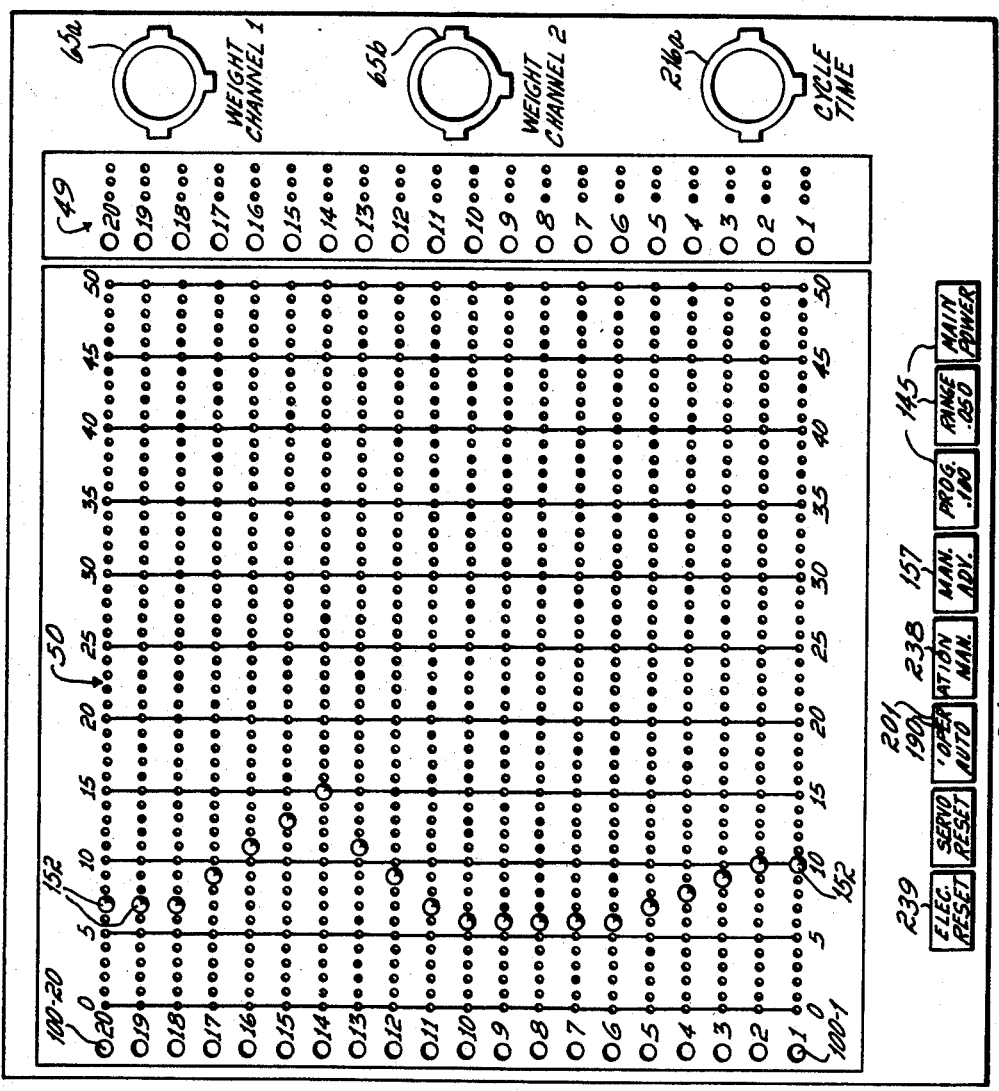
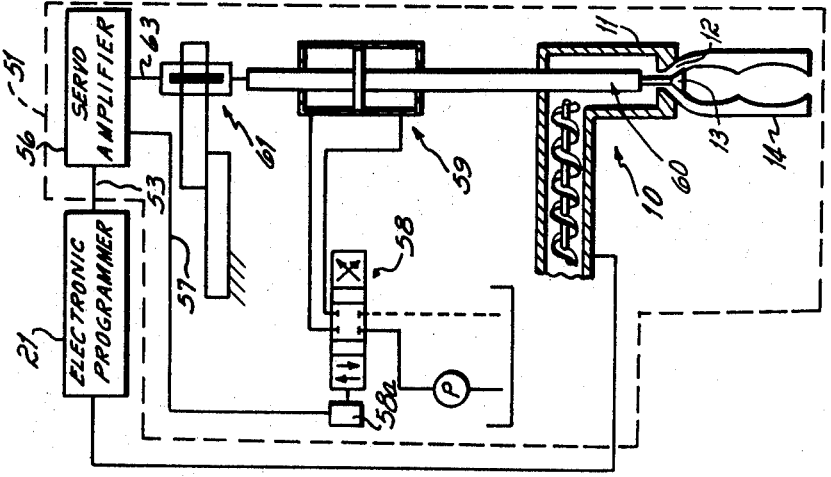

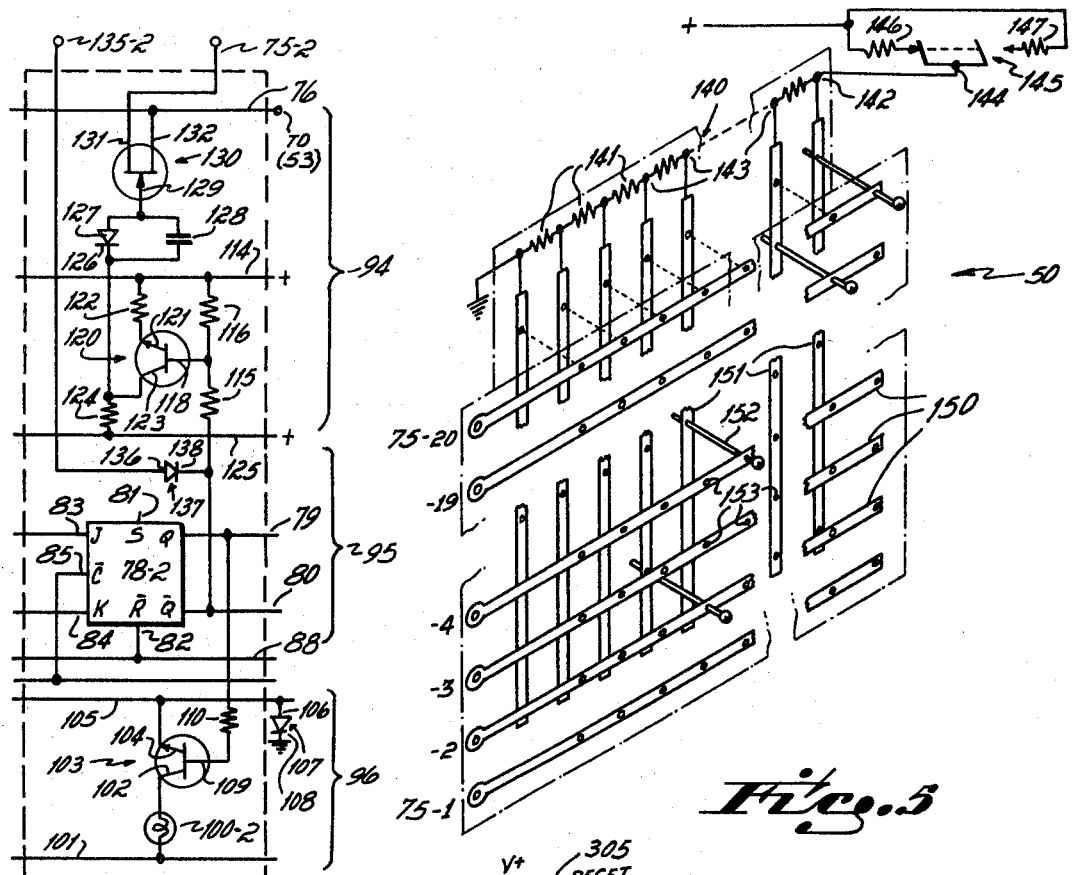
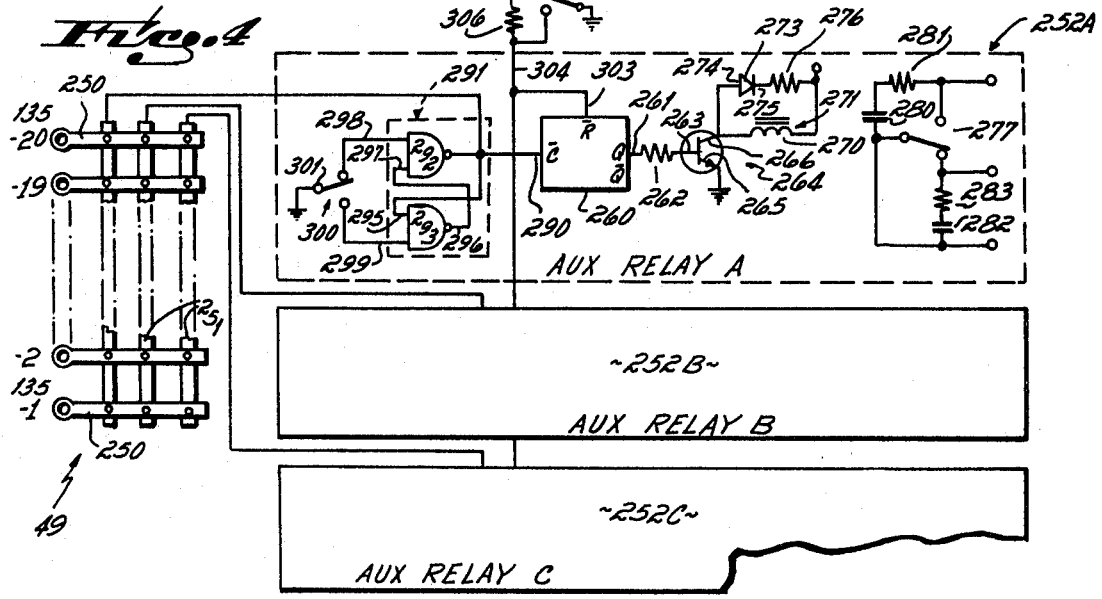
Fig. 4
Fig. 5
Fig. 6

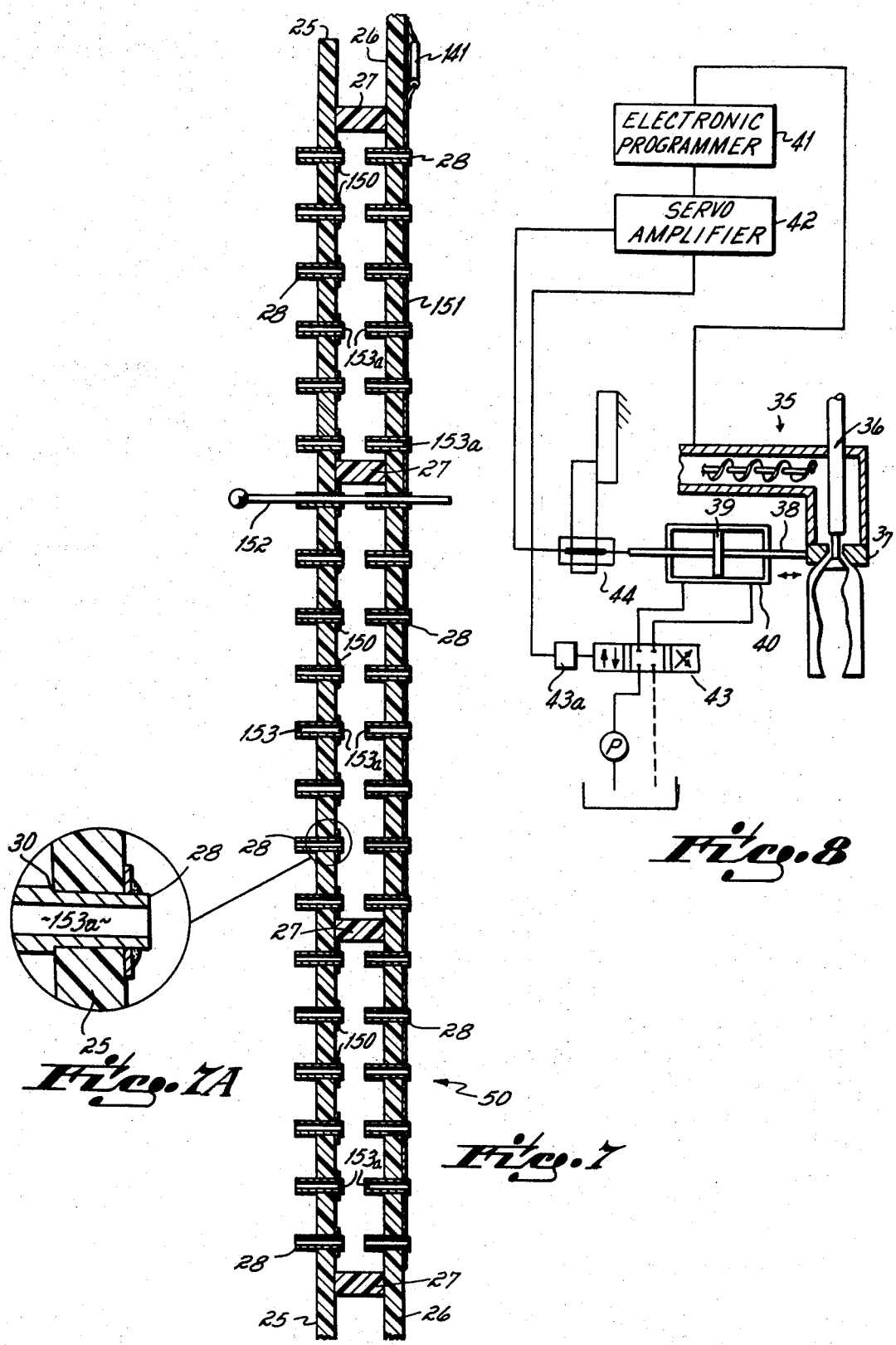

CONTROL SYSTEM FOR PARISON EXTRUDERS

This application is a continuation-in-part of U.S. Pat. application Ser. No. 875,448 filed Nov. 10, 1969, now abandoned.

BACKGROUND OF THE INVENTION

This invention relates to control devices for plastic molding machines and which are particularly useful with parison extrusion devices.

At the present time plastic bottles of the type in which detergents and other household products are sold are produced on high speed extrusion and blow molding machines. In these machines plastic is melted in the extruder and is forced through an annular die in the form of a tube. The thickness of the tube walls is varied by shifting a center core, or mandrel, relative to the surrounding circular die member. (Alternatively, the die member can be shifted relative to the mandrel.) The extruded tube is subsequently surrounded by a mold having the desired configuration of the bottle. While the tube is still soft, a gas under pressure is introduced into the tube to expand the tube into complete contact with the walls of the mold cavity. It has been found that substantial quantities of plastic can be saved by varying the wall thickness of the bottle so that the walls are thickest at areas of greatest stress concentration and are thinner where lesser strength is required.

The principal object of the present invention is to provide a control system for plastic molding machines and which it is particularly suitable for use with present day high speed extrusion machines for automatically varying the thickness of a parison as it is extruded and thereby precisely varying the thickness of the wall of a finished bottle or the like.

In the past there have been various proposals for automatically controlling parison thickness by electro mechanical arrangement, one such arrangement being disclosed in Williams U.S. Pat. No. 3,368,241. In general, these systems have included a function generator which is scanned by a mechanical stepping switch. This switch is connected to, and driven in synchronism with, the extruder and molding machine. The signal from the function generator is fed to a servo system including a motor or other actuator for shifting the mandrel relative to the die. A feedback loop is provided from a position transducer connected to the mandrel so that its position corresponds to that set on the function generator.

Prior art control systems of this type have not in fact proved practical in use. In the first place, mechanical stepping switches inherently introduce instability into servo systems since they involve a make-before-break contact arrangement. Moreover, these mechanical systems must be designed for a specific machine and cannot be universally adapted to the variety of extruders in the field. A third, and most serious, disadvantage is that mechanical switches are inherently slow in operation. For example, many cannot be programmed to control an extrusion cycle of less than thirty seconds duration and even the fastest presently available programmers cannot control cycles shorter than six seconds duration. On the other hand, the productivity of bottle extruding and molding equipment is being rapidly increased and extrusion cycles are being completed in as little as a fraction of a second.

Accordingly, one of the specific objects of the present invention is to provide a programmer for controlling high speed parison extruders with a very short operating cycle, for example, a cycle as short as one-tenth of a second.

Another object of the present invention is to provide an electronic control including a program panel which is scanned electronically by an electronic timer driving a transistor switching circuit. This combination requires no mechanical drive or interconnection to the extruder and can readily be set up to control any extruder. Moreover, the all solid state provides for stable and reliable operation of the servo system over protracted periods of use.

A further object of the present invention is to provide a control system which is effective to control the entire cycle of the extruder and is effective to initiate the extrusion cycle upon the occurrence of any selected event such as, for example, the attainment of a selected temperature or pressure of the material being extruded.

A still further object of the present invention is to provide a control unit which is effective to simultaneously control the operation of several different heads of a multi-head extruder. The unit is effective to cause each head to operate so that identical articles are produced despite variations in the extruder heads, feed lines to the heads and the like.

More particularly, the present invention is predicated upon the concept of providing a parison control including a matrix-type patch panel having rows of conductors corresponding to time intervals and vertical columns of conductors corresponding to increments of thickness. Each of the vertical conductors has associated with it a unique electrical characteristic. Any horizontal row can be selectively interconnected with any vertical column by means of a conductive pin insertable through sleeves aligned with the selected intersection of the vertical and horizontal conductors.

In addition to the patch board, the present control includes a synchronizing device which correlates the actuation of the switching circuit to some operating parameter of the machine. In the preferred embodiment, this device is an electronic timer or clock which is automatically effective to divide the entire extrusion cycle into a predetermined number of equal time increments, for example, twenty. This clock pulses the transistor switching circuit so that the circuit first makes a connection to the first horizontal "time" row. The electrical characteristic associated with this time row due to the interconnection of the row with one of the vertical columns is sampled by the actuation of the transistor switching circuit to apply a signal correlated with the sampled electrical characteristic to a servo amplifier. This signal is representative of the desired mandrel position. The mandrel position signal is amplified and used to drive a servo valve to reposition the mandrel until a feedback signal is received from a position transducer nulling out the command signal and indicating that the mandrel is in the selected position. At the end of the first time interval the switching circuit samples the electrical characteristic associated with the second time row and then applies a signal in accordance with the electrical characteristic to the servo amplifier and the mandrel is repositioned if necessary.

In this manner, the mandrel is sequentially positioned throughout each of the time intervals of the extrusion cycle in accordance with the program set up on the patch board.

In accordance with one embodiment of the present invention, the vertical conductors form part of a voltage divider network, with each conductor having a unique characteristic potential impressed upon it. The interconnection of a row and column of the matrix impresses one of these potentials from a vertical onto a horizontal conductor. A transistor switching circuit samples the potentials on each of the horizontal rows through field effort transistors which apply signals correlated with these potentials to the servo amplifier.

In accordance with another embodiment of the present invention, the electrical characteristic associated with each vertical conductor is a unique characterizing impedance which is associated with a horizontal conductor through interconnection of a row and column of the matrix. These impedances are in turn utilized to develop a potential which is characteristic of each particular vertical conductor and unique for that conductor. More particularly, a switching circuit samples the impedances associated with each horizontal row through solid state switches which connect the sampled impedance in series with a constant current source which produces a voltage drop across the impedance proportional to the impedance value. This voltage drop is amplified and then applied to the servo amplifier.

In accordance with the present invention an auxiliary "weight" control is provided for modifying the signal from the patch board to the servo amplifier. This "weight" control provides a signal which is algebraically added to, or subtracted from, the signal from the patch board. As a result, the total weight of the parison can be changed without affecting the differential changes in wall thickness from interval-to-interval. This weight control is particularly useful in the operation of multihead machines since it provides a ready means for compensating for differences between the various heads in the extruder.

The present program control can also be utilized to control auxiliary functions, e.g. the operation of other equipment in timed synchronization with the extrusion cycle. This control is effected through an auxiliary patch board having rows to which a potential is applied sequentially in timed sequence with the rows of the main patch panel. The horizontal rows of the auxiliary patch panel cooperate with vertical conductors, each of which is adapted to energize an actuator for controlling a separate machine function. The vertical columns are adapted to be selectively connected to any horizontal row by means of an insertable pin. When so connected at predetermined times in the operating cycle, potentials are applied from the horizontal conductors through the vertical columns to relays or other auxiliary equipment-actuating devices.

Another object of the present invention is to provide a control which is extremely compact and reliable in operation. In accordance with the present invention the patch board is of extremely high density providing, for example, a matrix of over 1000 possible connections in a few square inches. This patch board comprises two spaced nonconductive panels. Each panel is provided with an array of apertures arranged in rows and columns. Each of these apertures receives a shouldered sleeve. The sleeves are held in place and electronically interconnected by printed conductors formed on the backs of the panels and by solder strips deposited on tapes overlying the printed circuit strips. The printed circuit strips and solder strips constitute the vertical and horizontal conductors described above.

It is another concept of the present invention that the control system can be utilized to vary the thickness of a parison in an asymmetrical manner, i.e. to make one side of the parison wall thicker than the opposite portion of the wall. This is highly desirable in some types of containers where one side of the container is of a special configuration, for example, constitutes a handle.

In accordance with one aspect of the present invention the control system is utilized to control the transverse position of a die ring relative to the core or mandrel. By shifting the die ring transversely from a position concentric with the core or mandrel to an eccentric position, the annular extrusion orifice becomes larger on one side than the other and an asymmetrical parison is extruded. The symmetry or asymmetry of the parison is controlled during the various sequential periods of the extrusion cycle by the present control circuit in the manner described above. It will, of course, be obvious that this latter control for shifting the die ring transversely can be utilized at the same time as a control for shifting the mandrel to effect symmetrical variations in wall thickness.

These and other objects and advantages of the present invention will be more readily apparent from a consideration of the following detailed description of the drawings illustrating one preferred form of an electronic programmer embodying the principles of the present invention.

DESCRIPTION OF THE DRAWINGS

FIG. 1 is a diagrammatic view of a parison extrusion machine incorporating the present electronic control.

FIG. 2 is a front elevational view of the present programmer.

FIG. 4 is a schematic diagram of a program point block of FIG. 3.

FIG. 5 is a partial schematic and partial diagrammatic perspective view of the conductors of the patch board illustrated in FIG. 2.

FIG. 6 is a schematic diagram of the auxiliary patch board and related auxiliary circuitry.

FIG. 7 is a vertical cross-sectional view through the patch board.

FIG. 7A is an enlarged fragmentary portion of the encircled area of FIG. 7.

FIG. 8 is a diagrammatic view of a modified form of parison extrusion machine utilizing the present electronic control.

GENERAL DESCRIPTION

Figure 3:
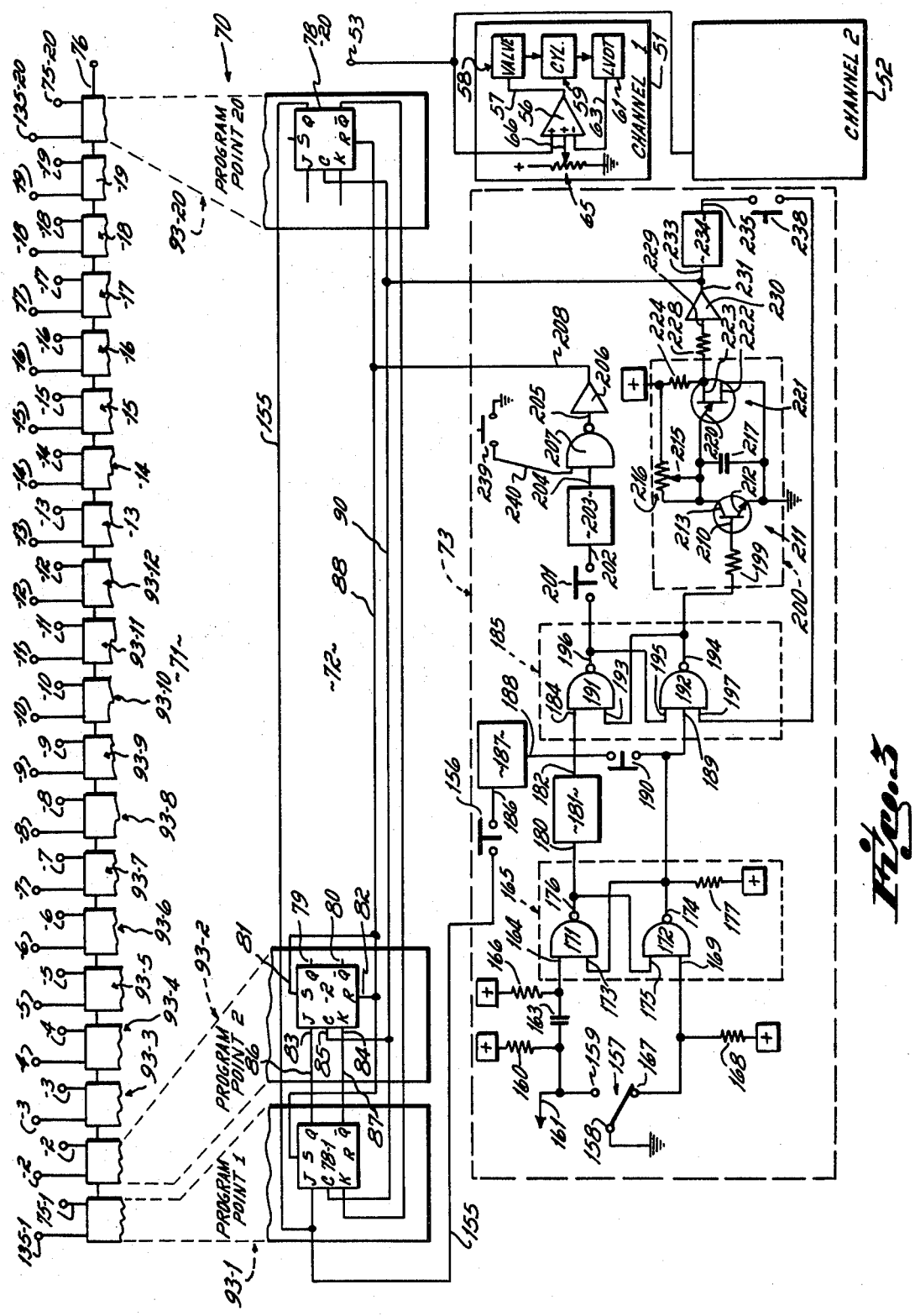
FIG. 3 is a partial schematic and partial block diagram of the electrical circuitry of the system shown in FIG. 1.

The present electronic control is particularly adapted for controlling parison extrusion machines, although other fields of utility for the control will undoubtedly occur to those skilled in the art. FIG. 1 illustrates diagrammatically one form of parison extruder 10 controlled by the present system. It is to be understood that the specific details of the parison extruder constitute no part of the present invention. In general, the extruder 10 receives a quantity of plastic which is heated in the extruder and is forced from one or more extruder heads 11. Each head 11 is provided with a stationary die orifice 12 and mandrel 60 including a core portion 13 which cooperates with the stationary die opening. The relative position of the mandrel and the die controls the size of the die opening and, hence, the wall thickness of the extruded plastic tube.

The length of tube, or parison, 14 extruded from the head 11 is received in a mold (not shown) consisting of two mold halves which completely encase the tube. The tube, which is still soft, is subsequently expanded into contact with the mold walls by the injection of gas under pressure into the interior of the mold. Again, the construction of the mold constitutes no part of the present invention.

Details of one suitable form of extruding apparatus and molding apparatus are shown in Negoro U.S. Pat. No. 3,019,481 for "Variable Orifice Extrusion Die," Ruekberg et al. U.S. Pat. No. 2,784,452 for "Vertical Machine With Radially Moving Molds For Forming Hollow Articles" and Williams U.S. Pat. No. 3,368,241 for "Functionally Controlled Electro-Servo Variable Extrusion Apparatus."

It is to be understood that the present control system can be used with other types of extrusion apparatus; for example, apparatus of the type in which the mandrel remains stationary while the extruder head is shifted toward and away from the mandrel to vary the size of the die opening and, hence, the thickness of the extruded tube wall. Moreover, the control system can be utilized, as shown diagrammatically in FIG. 8, with an extruder of the type having a transversely shiftable die so that the thickness of the wall can be varied asymmetrically, i.e. one side of the wall made thicker than the opposite sides. This particular embodiment is described in detail below.

As shown diagrammatically in FIG. 1, the function of the present control system is to cause the extruder to be operated so that the wall thickness of the parison 14 can be varied in a predetermined manner. The principal components of the control system comprise an electronic programmer 21 including a main patch panel 50 upon which the program is set up. A servo amplifier 56 receives control signals from this electronic programmer through line 53. The servo amplifier drives a servo valve 58 which in turn controls the application of pressure fluid to a mandrel-shifting cylinder 59. A feedback signal indicating the position of the mandrel is generated by a linear motion transducer (LVDT) 61 which is connected to the mandrel and generates an electrical feedback signal returned to the servo amplifier through lead 63.

As used in the present parison control, patch panel 50 includes fifty columns or vertical conductors corresponding to increments of wall thickness. For example, in one embodiment each vertical conductor or column corresponds to a 0.002 inch increment in wall thickness. Each vertical conductor is identified by a characteristic potential applied to that conductor. The patch panel also includes twenty horizontal conductors, or rows, corresponding to increments of time during the extrusion cycle of the machine. Thus, if a total extrusion cycle requires two seconds, each horizontal conductor corresponds to one-tenth of a second. As is explained in detail below, each of the horizontal "time" rows, or conductors, is selectively connected with one of the vertical or "thickness" conductors by means of a pin 152 inserted through an appropriate opening in the patch panel at the intersection point of the desired vertical and horizontal conductor.

The electronic programmer includes an electronic clock which is effective to divide the extrusion cycle time into a number (20 in the embodiment shown) of equal time increments. The clock generates a signal at the beginning of each time increment and these signals are utilized to step a solid state switching circuit. This circuit is effective to first select the initial horizontal, or "time", row; then after a preselected time interval, the second horizontal row; after another time interval, the third row; and so on until each of the 20 rows has been sequentially connected to the control circuit. As each row is connected, the electrical characteristic associated with that row through the interconnection of the row to a specific one of the columns by the associated pin 152 is sampled and utilized as a control signal for the servo amplifier. The servo amplifier is effective to cause the mandrel to be shifted until the feedback signal from transducer 61 nulls out the input signal to the servo amplifier indicating that the mandrel is positioned in accordance with the program set up.

The electrical details of the electronic programmer 21 of FIG. 1 are illustrated in two embodiments in FIGS. 3–6 and 9, in which the electrical circuitry shown in FIG. 1 for controlling head 11 is represented by the block labeled "channel 1" in FIG. 3. A single electronic programmer is capable of driving several such channels and thereby controlling several extruder heads.

In the following description of the logic circuitry, the terms "1-state," "ON state" and "positive state" are synonymous and similarly the terms "0-state," "OFF state" and "negative state" are synonymous. Also, a transition from the 0-state to the 1-state will be referred to as the "leading edge of a pulse" and a transition from the 1-state to the 0-state will be referred to as the "trailing edge of a pulse."

Referring to FIGS. 1 and 3, two channels 51 and 52 are driven by the output 53 of the electronic programmer. Each channel includes a servo amplifier 56 having its output 57 connected to the torque coil 58a of servo valve 58. The output of the servo valve controls the flow of pressure fluid to a hydraulic cylinder 59 which houses a piston coupled to the extrusion mandrel 60. The position of the extrusion mandrel 60 is sensed by a linear motion transducer (LVDT) 61 which feeds back a proportional electrical signal on line 63 to the servo amplifier 56. The servo amplifier 56 generates an error signal at its output 57 corresponding to the algebraic difference between the input signal on line 53 and the feedback signal on line 63.

A weight control variable potentiometer 65 is connected between the positive voltage source and ground. The wiper 66 of potentiometer 65 is connected to an input of the servo amplifier 56. The servo amplifier algebraically adds the voltage on wiper 66 to the input signal on line 53. This setting of the potentiometer 65 allows for the introduction of an initial displacement to the mandrel position. Thus, the weight of a parison can be varied without affecting the programmed changes in wall thickness. This weight control is particularly useful to provide for, or to compensate for, differences among different heads on a multiple head machine.

The electronic programmer 21 includes an electronic program board 70 which is shown in FIG. 3 and patch panel 50 which is illustrated in FIGS. 2, 5 and 7. The electronic program board 70 includes a scanner 71, a shift register 72, and a timing circuit 73. The scanner 71 has 20 input terminals 75-1 through 75-20 and a single output 76. Each of the 20 inputs 75-1 ... 75-20 corresponds to a respective one of the horizontal rows of the patch panel 50 which is described in more detail below. The scanner 71 samples a selected one of the inputs 75 to apply the electrical characteristic associated with that input to the output 76.

The shift register 72 is a 20 bit shift register having a flip-flop 78-1 through 78-20 at each bit position, each corresponding to one of the scanner inputs 75. The flip-flops 78-1 ... 78-20 are standard JK flip-flops having positive and negative outputs 79 and 80, respectively, set and reset inputs 81 and 82, respectively, J and K inputs 83 and 84, respectively, and a clock input 85.

The flip-flops 78-1 ... 78-20 of shift register 72 are wired together as a conventional circular shift register, with the positive output 79 and the negative output 80 of one flip-flop connected to the J input 83 and K input 84, respectively, of the next succeeding flip-flop through lines 86 and 87 respectively. The set input 81 of the first flip-flop 78-1 and the reset inputs 82 of the other nineteen of the flip-flops 78-2 ... 78-20 are connected together through reset line 88. Upon a grounding of the reset line 88, the first flip-flop 78-1 will be set to the "ON" state and the remainder of the flip-flops will be turned off. The clock inputs 85 of the flip-flops 78-1 ... 78-20 are connected together through clock line 90. The trailing edge of a pulse on line 90 will cause each of the flip-flops 78-1 through 78-20 to assume the state of the preceding flip-flop of the shift register, thus causing a bit originally set in the first flip-flop 78-1 to shift along the register one position upon pulses of the clock. The presence of a bit in any one of the flip-flops causes the respective input 75-1 through 75-20 of the scanner 71 to be connected to the scanner output 76.

The scanner 71 together with the shift register 72 are divided into 20 program points 93-1 through 93-20. Each of these program points is identical except for the connection in program point 93-1 of the set input 81 rather than the reset input 82 to reset line 88. Each includes one of twenty identical portions of the scanner 71 and the shift register 72. Each program point includes one of flip-flops 78 and the corresponding scanner input terminal 75. A detailed schematic of program point 93-2 is presented in FIG. 4.

Referring to FIG. 4, a program point 93-2 is shown divided into three portions: a solid state switch 94 which is a portion of the scanner 71, a shift register bit 95 which is the corresponding portion of the shift register 72, and a lamp circuit 96 which indicates the condition of the shift register bit 95. The flip-flop 78-2 is connected as indicated above.

The lamp circuit 96 includes a lamp 100-2 which is connected between a positive DC potential bus 101 and the collector 102 of an NPN transistor 103. The emitter 104 of the transistor 103 is connected to bus 105 which is connected externally of the program point 93-2 to the anode 106 of diode 107 which is connected at its cathode 108 to ground. The base 109 of transistor 103 is connected through resistor 110 to the positive output 79 of the corresponding one of the flip-flops 78. Thus, when flip-flop 78-2 is in its ON state, transistor 103 becomes shorted to ground, thereby switching on the indicator light 100-2. When the flip-flop 78-2 is in its OFF state, transistor 103 remains nonconductive so that indicator light 100-2 remains off.

According to one embodiment of the present invention, the electrical characteristic on the inputs 75 is a unique characteristic potential, and the electronic switches are FETs which sample the potentials and apply them to the scanner output 76. In this embodiment, the negative output terminal 80 of flip-flop 78-2 is connected through a resistive voltage divider to negative bus line 114. The voltage divider consists of resistors 115 and 116 connected in series. The junction of resistors 115 and 116 is connected to the base 118 of NPN transistor 120. Emitter 121 of transistor 120 is connected through resistor 122 to the negative bus line 114. The collector 123 of transistor 120 is connected through resistor 124 to positive bus line 125. Emitter 123 is also connected to the cathode 126 of diode 127. Across diode 127 is connected a capacitor 128. The anode of diode 127 is connected to the gate 129 of FET 130. The drain 131 of FET 130 is connected to the corresponding input line 75. The source 132 of FET 130 is connected to the output line 76 of the electronic program board 70. Thus, when the flip-flop 78 is in the OFF state, the negative output 80 of flip-flop 78 is positive and the base 118 of transistor 120 is relatively positive causing transistor 120 to conduct. When the transistor 120 is conducting, its collector 123 is in a low voltage state and a relatively negative potential is applied to the gate 129 of FET 130 through diode 127. This causes the FET 130 to remain nonconductive. When flip-flop 78 is in the ON state, a relatively negative potential appears at the negative output 80 of the flip-flop 78. Thus, a relatively negative potential appears at the base 118 of transistor 120 which renders transistor 120 nonconductive. Capacitor 128 is charged through resistor 124 and a relatively positive potential appears on the gate 129 of FET 130. This renders FET 130 conductive so that the voltage at the corresponding input terminal 75 is applied through the drain 131 to the source 132 of FET 130 and to the output line 76. An auxiliary terminal 135 is provided for connection to an auxiliary patch board 49 and circuitry shown in FIG. 6 and discussed in detail below. Twenty rows of contacts are provided on patch board 50, one for each of the program points 93. Auxiliary terminal 135 is connected to the anode 136 of diode 137. The cathode 138 of diode 137 is connected to the negative output 80 of the corresponding flip-flop 78. The diode 137 provides isolation between the flip-flop 78 of the shift register 72 when the auxiliary contacts 135 are connected.

According to the same "characteristic voltage" embodiment of the invention, FIG. 5 illustrates the wiring of the patch panel 50. A voltage divider 140 is provided which comprises 50 resistors 141 which are connected in series between a reference voltage point 142 and ground. The voltage divider 140 provides 49 intermediate voltage reference points at evenly spaced levels between the voltage reference 142 and ground. It will be obvious that a greater or lesser number of reference points can be utilized. The voltage reference point 142 is connected to the pole 144 of a single-pole double-throw switch 145 or the equivalent, which is shown as alternate push-button switches on the panel of FIG. 2. This switch 145 alternatively connects the voltage reference point 142 through one of the resistors 146 or 147 to a source of positive DC voltage. The resistors 146 and 147 are of differing values. The switch 145 therefore provides a means to vary the reference voltage at point 142 and therefore to vary the voltage drop across each of the resistors 141, thus changing the incremental spacing of the voltage levels 143.

The mechanical details of construction of patch panel 50 are described below in connection with a description of FIG. 8. In general, the panel 50 is made up of plural horizontal and vertical conductors arranged in the form of a 20-by-51 crossbar matrix. The 20 horizontal conductors each connect to a respective one of the FET scanner inputs 75. The 51 vertical conductors each connect to a respective point along voltage divider 140, the first such point connecting to ground, the 51st connecting to voltage reference point 142, and the 49 intermediate conductors connecting to a respective one of the intermediate voltage reference points 143.

Pins 152 can be inserted selectively into holes 153 in the patch panel to connect one of the horizontal conductors 150 to one of the vertical conductors 151. This connection applies the reference voltage at one of the points 143 of the voltage divider 140 to a respective input terminal 75 of the FET scanner. When the flip-flop 78 of the program point corresponding to that terminal is switched on, this voltage is applied to the scanner output terminal 76 and thus to servo input line 53 of the servo amplifier 56 which will cause the mandrel 60 to assume a nozzle opening dimension corresponding to the position of the pin 152 on the patch board.

According to another embodiment of the present invention, the electrical characteristic on the inputs 75 is a unique characterizing impedance, and the electronic switches are transistor switches which connect the impedances to an impedance sensitive circuit by selectively grounding the horizontal conductors of the matrix. In this embodiment, the solid state switch portion 94 of FIG. 4, and the wiring of the matrix board 50 of FIG. 5, are modified as illustrated in FIG. 9.

Figure 9:
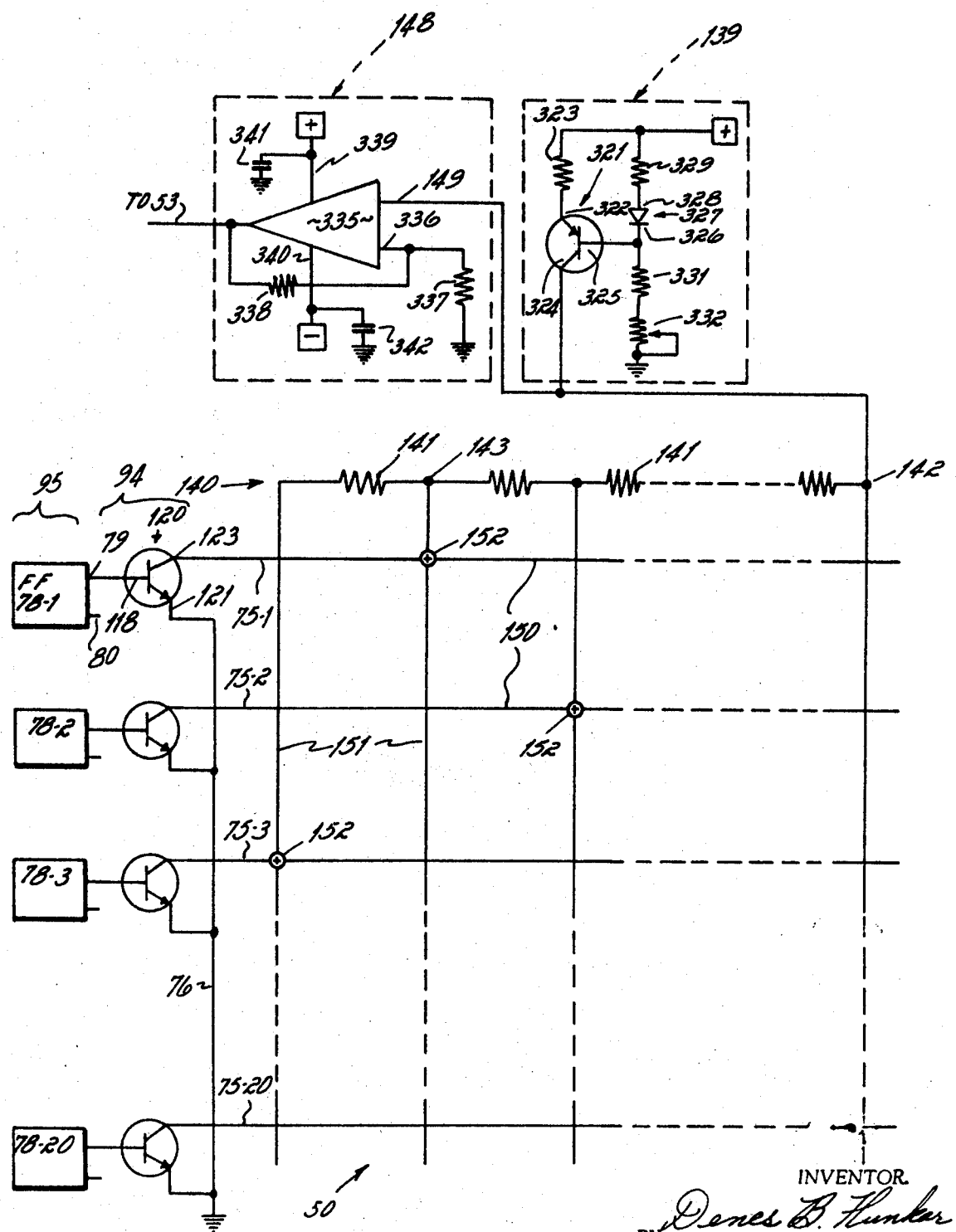
FIG. 9 is a schematic diagram of an alternative embodiment of the present invention illustrating the scanner and patch board of FIGS. 4 and 5 with certain modifications.

According to this alternative embodiment, for each of the program points 93, the solid state switch 94 comprises the NPN switching transistor 120 connected as shown in FIG. 9 with its base 118 connected to the positive output 79 of the flip-flop 78. Emitter 121 of transistor 120 is connected to the output line 76 which is connected in turn to ground. The collector 123 of transistor 120 is connected to the corresponding input line 75. Thus, when the flip-flop 78 is in the ON state, the positive output 79 of flip-flop 78 is positive and the base 118 of transistor 120 is relatively positive causing transistor 120 to conduct. When the transistor 120 is conducting, the corresponding input terminal 75 is grounded to the output line 76. The impedance circuit 140 provides a plurality of impedances selectively connectable into an impedance sensitive circuit which includes a constant current source 139, and an amplifier 148 for applying a signal to the servo amplifiers 51 and 52 in accordance with the values of these impedances. Specifically, the circuit 140 comprises the fifty resistors 141 connected in series with each other and the constant current source 139. The resistors 141 are equal in value and define 51 node points including an end point 142 connected to the current source 139, and 50 nodes 143 including 49 intermediate nodes at the junctions of the adjacent resistors and the other end node. The nodes 142 and 143 provide points for connecting 51 different characterizing impedances into a closed circuit with the source 139 by a grounding of the respective nodes.

The node 142 connected to the source 139 is also connected to the input 149 of an amplifier 148. The amplifier 148 has an output connected to the programmer output terminal 53 and generates an output signal on line 53 and is responsive to the voltage drop across the selected impedance caused by the constant current flowing through that impedance. This current is in direct relation to the value of that impedance.

The constant current source 139 includes a PNP transistor 321 having an emitter 322 connected through a resistor 323 to the positive voltage source, and a collector 324 connected to the one of the end nodes 142 of the impedance circuit 140. The base 325 of transistor 321 is connected to the cathode 326 of diode 327. The anode 328 of diode 327 connects through a resistor 329 to the positive voltage source. The base 325 also connects through a resistor 331 and a variable resistor 332 to ground. The variable resistor provides a means to vary the current level through the constant current source 139 by varying the control voltage at the transistor base 325, and thus to proportionally vary the voltage differential across each of the resistors 141, thereby providing a means for changing the incremental spacing in the signal levels from the output of the amplifier 148.

The amplifier 148 includes a high gain differential amplifier 335 having a first high impedance input 149 connected to the collector 324 of the source transistor 321, and a second input 336 connected through a resistor 337 to ground and a feedback resistor 338 to the amplifier output 53. The amplifier 335 is also provided with power terminals 339 and 340 connected to the positive and negative voltage sources respectively and through filter capacitors 341 and 342 respectively to ground.

In programming the patch panel 50, certain pins 152 are connected, for example as shown in FIG. 9, to connect each of the lines 150 with one of the lines 151. As the flip-flops 78 of the shift register are sequentially turned ON to apply signals to the bases 118 of the transistors 120, the transistors 120 are switched ON grounding the respective lines 150. This grounds the one of the lines 151 which is connected through the pin 152 and thus grounds a point on the impedance circuit 140, closing a circuit through the current source 139. A voltage level equal to the voltage drop across the impedance is applied at the input 149 of the amplifier 148, to alter the signal at the programmer output 53 in accordance with this input potential. Thus, as the flip-flops 78 are sequentially switched ON, the servo amplifier 56 will cause the mandrel 60 to assume a nozzle opening dimension corresponding to the position of the pin 152 on the patch board.

Referring again to FIG. 3, the timing circuit 73 provides basically two output signals. The first signal is a reset pulse which is provided on line 88, the second is a clock pulse which is provided on line 90. The timing circuit will put out twenty pulses on line 90 for each one pulse on line 88 during normal operation in automatic mode.

During automatic operation, an initiating signal is received by the timer through lead 161 connected to the extrusion machine. This "start" signal can be correlated with any desired function of the machine; for example, it can be sent when the plastic material in the extruder reaches a certain temperature. In any event, this signal causes a reset pulse to appear on line 88 setting a one in the first flip-flop 78–1 of the shift register 72. The timing circuit 73 will then put out 20 clock pulses on line 90 at evenly spaced intervals of time. The total time required for the 20 pulses corresponds to the time to extrude one parison. These pulses will cause the bit to shift sequentially through the shift register from program point 1 on through program point 20 and then directly back to program point 1.

The transfer of the bit from program point 20 to program point 1 is sensed by the timing circuit through line 155 which is connected to the positive output of the flip-flop 78–20 of program point twenty. The other end of line 155 is connected into the timing circuit through switch 156 which is normally closed during normal operation. The sensing of the transfer of the bit from program point 20 to program point 1 causes suppression of further clock pulses and thus stops the programmer. When switch 156 is opened, this shift is not sensed and the programmer will run freely and the bit will continue to circulate freely through the register. In normal automatic mode, however, once the register has stopped a further start signal must be received by the timing circuit 73 to reinitiate another 20-cycle sequence of operation. This start pulse is, as explained above, supplied by the extruding machine when it is ready for the next cycle.

The extruder can also be operated in a manual mode. During manual mode, clock pulses are not emitted automatically, but must be individually initiated through the application of a start pulse via the manual advance switch 157 on the front panel.

The manual advance switch 157 is a single-pole double-throw momentary switch of which the pole 158 is normally grounded. The normally open contact 159 of switch 157 is connected through resistor 160 to a positive voltage source. The normally open contact 159 is also connected through a lead 161 to the extrusion machine. Through lead 161 a start pulse is applied during automatic mode to initiate a 20-cycle scan. The normally open contact 159 of switch 157 is connected through capacitor 163 to the input 164 of the RS flip-flop 165. The input 164 is also connected through resistor 166 to a positive voltage source. The normally closed contact 167 of switch 157 is connected through resistor 168 to the positive voltage source. Contact 167 is also connected to input 169 of the RS flip-flop 165. Flip-flop 165 is primarily provided to isolate the timer from the switch 157 and to eliminate the effects of contact bounce.

Flip-flop 165 comprises a pair of NAND gates 171 and 172. The inputs of the NAND gate 171 are the flip-flop input 164 and input 173 which is connected to the output 174 of NAND gate 172. The inputs of NAND gate 172 are the flip-flop input 169 and NAND gate input 175 which is connected to output 167 of NAND gate 171. Output 174 of NAND gate 172 is connected through resistor 177 to the positive voltage source. The outputs 176 and 174 of the NAND gates 171 and 172 constitute the outputs of the RS flip-flop 165.

Output 176 is connected to the input 180 of one-shot multivibrator 181. The output 182 of the one-shot 181 is connected to the input 184 of a second RS flip-flop 185. The output 174 of flip-flop 165 is connected to input 189 of flip-flop 185. Input 189 is also connected to the output 188 of a one-shot multivibrator 187. The input 186 of multivibrator 187 is connected through switch 156 to line 155 which is the line through which the transfer of a bit from program point 20 to program point one of the shift register 72 is sensed. Between the output 188 of the one-shot 187 and the input 189 of flip-flop 185 is a switch 190 which is closed during automatic operation and open during manual operation.

Flip-flop 185 comprises NAND gates 191 and 192. The inputs of NAND gate 191 are the flip-flop input 184 and input 193 which is connected to output 194 of NAND gate 192. The inputs of NAND gate 192 are the flip-flop input 189, input 195 which is connected to output 196 of NAND gate 191, and input 197. The outputs 196 and 194 of NAND gates 191 and 192, respectively, constitute the outputs of RS flip-flop 185.

The output 194 of flip-flop 185 is connected to the input resistor 199 of oscillator 200. Output 196 of flip-flop 185 is connected through switch 201 to the input 202 of one-shot multivibrator 203. Switch 201 is closed during automatic operation and open during manual operation. The output 204 of one-shot 203 is connected to input 205 of driver 206 through NAND gate 207 which serves to invert the output of the one-shot 203 and to provide a strong reset pulse of the same polarity as the one-shot pulse on line 88 to which the output 208 of driver 206 is connected.

The opposite end of input resistor 199 of oscillator 200 is connected to the base 210 of transistor 211. The emitter 212 is connected to ground. The collector 213 of transistor 211 is connected to the wiper 215 of cycle time-setting potentiometer 216, one end of which is connected to the positive voltage source. Collector 123 is also connected through capacitor 217 to ground. The collector 213 is also connected to the base 220 of unijunction transistor 221. The emitter 222 of unijunction transistor 221 is connected to ground. The collector 223 of unijunction 221 is connected through resistor 224 to the positive voltage source.

Oscillator 200 is thus a unijunction relaxation oscillator in which potentiometer 216 and capacitor 217 establish the time constant. The potentiometer 216 provides means for varying the time constant of the oscillator which determines the cycle time of the shift register 72. In practice, potentiometer 216 is adjusted by turning knob 216a (FIG. 2) to set the desired total cycle time which can be read on the digital register associated with knob 216a.

Transistor 211 is a shunting transistor which acts as a switch to suppress the oscillator. Collector 223 of unijunction transistor 221 is connected through resistor 228 to the input 229 of driver amplifier 230. The output 231 of amplifier 230 is connected to line 90 to apply clock pulses to the flip-flops 78 of shift register 72. The driver output 231 is also connected to the input 233 of one-shot multivibrator 234. The output 235 of one-shot 234 is connected through switch 238 to the input 197 of NAND gate 192. Switch 238 is closed during manual operation and open during automatic operation. This switch serves to feed back the clock pulse during manual operation through RS flip-flop 185 to shunting transistor 211 of the oscillator 200 to thereby extinguish the oscillator after one pulse has been emitted.

A momentary, normally-open, manual reset switch 239 is connected between input 240 of NAND gate 207 and ground to provide a means for manually clearing the shift register 72.

It is often desirable to control other functions of the extruder or other equipment in timed relation to the extrusion cycle. In the present system this is accomplished through an auxiliary control patch panel 49. Referring now to FIG. 6, the auxiliary patch panel 49 comprises twenty horizontal conductors 250 and three vertical conductors 251. The conductors 250 are connected to a corresponding one of the auxiliary contacts 135 of the electronic program board 70 shown in FIG. 3. Thus, the states of the respective flip-flops 78 are sensed on these lines. Each of the vertical conductors is connected to auxiliary relays 252 which in turn operate auxiliary devices. By programming the auxiliary contact board, the operation of these auxiliary devices can be caused to correspond to any or all of the positions of the bit in the shift register.

The auxiliary relay circuits 252 shown in the form illustrated in FIG. 6 operate to either turn the relay on or off when a selected cross point in the auxiliary matrix is energized. Thus, two successive pins in any one of the vertical columns will cause the associated relay to first switch on and then switch off as these points are selectively energized by a bit passing through the corresponding flip-flops of the shift register.

More particularly, the auxiliary relay circuit includes a flip-flop 260 having its positive output 261 connected through a resistor 262 to the base 236 of a transistor 264. The emitter 265 of the transistor 264 is connected to ground. The collector 266 of the transistor 264 is connected in series with the coil 270 of a relay 271. Thus, when the flip-flop is in the ON state, the transistor 264 is conducting and the relay 271 is energized. Connected across the relay coil 270 at relay 271 is a diode 273 having its anode 274 connected to the collector 266 of transistor 264 and its cathode 275 connected through resistor 276 to the opposite end of relay coil 270, which in turn is connected to a source of positive voltage. This releases the stored energy from the coil upon deenergization. The contact circuit of the relay 271 is illustrated by a switch 277 having a capacitor 280 and resistor 281 connected in series between the switch wiper and the normally open contact. A capacitor 282 and a resistor 283 are connected between the wiper and the normally closed contact of the switch. The wiper of the switch is the common terminal in the output circuit.

The clock input terminal 290 of flip-flop 260 is connected to one of the vertical conductors 251 of the auxiliary patch board. This clock input 290 is also connected to the output of an RS flip-flop 291. Flip-flop 291 comprises a pair of NAND gates 292 and 293 of which the output of NAND gate 292 is connected to the input 295 of NAND gate 293 and the output 296 of NAND gate 293 is connected to the input 297 of NAND gate 292. The other output 298 of NAND gate 292 is connected to the normally closed contact of a switch 300, the output 301 of which is connected to ground. The normally open contact of switch 300 is connected to the other input 299 of NAND gate 293. Flip-flop 291 together with switch 301, which is a momentary switch, acts as a push-on, push-off manual control for the flip-flop 260 and thus the auxiliary relay 271.

The reset terminals 303 of the flip-flop 260 of each auxiliary relay circuit 252 are connected together through line 304 and through switch 305 to ground, and also are connected through resistor 306 to the positive voltage source. Closure of the switch 305 vents the flip-flop 260 to zero.

The physical construction of patch panel 50 is best shown in FIGS. 2, 5, 7 and 7A. As there shown, patch panel 50 comprises two spaced panel boards 25 and 26. These boards are formed of a nonconductive material, preferably plastic. The sheets are tied together in parallel spaced relationship by means of a series of nonconductive spacer blocks 27 which are disposed between the sheets and are adhesively secured thereto.

Each of the panel boards is provided with a matrix of openings, the matrix comprising 51 vertical columns and 20 horizontal rows. Each sleeve preferably includes a portion of reduced diameter which fits through the opening in the sheet and a shoulder portion 30 of slightly larger diameter which abuts one surface of the sheet. Each sleeve also includes a center bore 153a having inwardly projecting spring fingers (not shown) for frictionally receiving the stem of headed pin 152.

The front board 25 has a series of 20 horizontal conductive strips 150 printed on the rear surface thereof, the strips being in registry with the rows of openings. Each of these strips is then covered with a layer of tape and, finally, a horizontal layer of solder is laid over the tape. This solder functions to provide an electrical interconnection between each of the sleeves in any given row and also functions to hold the sleeves mechanically in place.

The rear panel 26 also carries a sleeve in each of the openings formed therein. In the case of the rear panel, however, there are no horizontal conductive strips, but rather 51 vertically disposed conductive strips 151. These strips contact the sleeves 28 which are identical with the sleeves inserted in the front panel. The sleeves are held assembled with the rear panel by means of vertical tapes and solder overlays running along each of the 51 vertical columns. The upper ends of the vertical columns are interconnected by resistors 141 whereby the vertical strips form part of an electrical network, each strip having a unique electrical characteristic associated therewith which differs from that of the other strips.

It is to be understood that the physical construction of auxiliary patch panel 49 is substantially the same as that of patch panel 50.

In operation, the program is set up by inserting one pin in each of the twenty rows of apertures in accordance with the desired thickness of the parison at that point in the extrusion cycle. The weight potentiometer 65 is set by turning knob 65a initially to give the total desired weight. If the extruder includes more than one head, a potentiometer 65 in each channel can be adjusted by means of knobs 65a and 65b to compensate for any difference between various heads on the extruder, it being understood that one weight potentiometer 65 is associated with the control circuit of each individual head. Another initial setting which is made is the setting of cycle time potentiometer 216. This is done by manipulation of knob 216a so that the total cycle time indicated on the associated register equals the total extrusion cycle time. This time is then automatically divided into 20 equal increments. After the program has been set up, the power is turned on and switch 239 is momentarily depressed to reset all the flip-flops of the shift register 72 to 0, except the first flip-flop which is set to 1.

For automatic operation, switches 190 and 201 are closed while switch 238 is open. The outputs 176 and 196 of RS flip-flops 165 and 185, respectively, are initially in the 0-state and the outputs of the one-shot multivibrators 181, 187, 203 and 234 are initially in the 1-state. The negative input pulse at terminal 159, either applied through manual depression of switch 157 or automatically through line 161, causes a positive-going output pulse on output 176 of RS flip-flop 165. The leading of this pulse triggers one-shot multivibrator 181, causing a negative-going output pulse of, for example, 10 microseconds, to appear at the output 182.

The leading edge of this pulse causes RS flip-flop 185 to change state, causing a positive 10 microsecond pulse to appear at the output 196. The leading edge of this pulse triggers one-shot multivibrator 203, causing a timed negative-going output pulse to appear at its output 204 which is twice inverted through gate 207 and driver 206 to present a strong negative-going pulse on line 88 which resets all flip-flops 78 to zero, except the first flip-flop at program point one which is set to one.

Simultaneously with this reset pulse, a negative-going 10 microsecond pulse appears at output 194 of RS flip-flop 185. This pulse turns off the shunting transistor 211 of oscillator 200 permitting the oscillator to oscillate, causing a series of timed pulses to appear on line 90. The trailing edge of these pulses sequentially triggers each flip-flop of the shift register to shift the bit from program point 1 sequentially through to program point 20 and then directly back to program point 1.

As the flip-flop at program point 20 turns on, one-shot 187 is triggered, causing a long negative pulse to appear at its output 188. This negative-going pulse at input 189 of flip-flop 185 causes flip-flop 185 to invert, shifting its output 194 from negative to positive. The positive voltage applied to transistor 211 causes it to conduct, shunting the oscillator and extinguishing it.

In manual operation, switches 190 and 201 are open and switch 238 is closed. Automatic reset is disabled by virtue of switch 201 being open. However, by virtue of switch 238 being closed, each timing pulse out of the oscillator will be fed back to flip-flop 185 to reset it, which in turn extinguishes the oscillator as described above.

The embodiment described above is effective to vary the wall thickness of a parison in a symmetrical manner, i.e. the entire tubular wall of the parison is varied equally in thickness from one point to another. In fabricating many articles, however, for example a bottle having a single side handle, it is desirable to vary the thickness of the parison in an asymmetrical manner, i.e. to make one side of the bottle thicker than the other. The present control system can be utilized to accomplish this result.

More particularly, one form of extruder and control for accomplishing this result is shown in FIG. 8. As there shown, an extruder 35 is provided with a mandrel 36 which is shiftable along a vertical axis by a servo system (not shown), but like that illustrated in FIG. 1. In the embodiment shown in FIG. 8, however, the die surrounding the mandrel is shiftable in a lateral direction so that the die orifice may be positioned concentrically with respect to the mandrel or off center with respect thereto.

The die orifice plate 37 is positioned by a piston rod 38 connected to a piston 39 housed in hydraulic cylinder 40. The position of the die plate 37 is controlled by a control system like that shown in FIG. 1. Specifically, this system includes a programmer 41 provided with a patch panel and other controls like that shown in FIG. 2. However, in this instance the vertical columns of the patch panel correspond to the amount of eccentricity. Programmer 41 provides a control signal to a servo amplifier 42 and the servo amplifier in turn energizes the torque coil 43a of a hydraulic servo valve 43. This valve controls the flow of pressure fluid to cylinder 40 causing the piston and die ring 37 to be shifted. Piston rod 38 is also connected to a linear displacement transducer 44, such as an LVDT. The signal from this transducer is fed back to the servo amplifier 42 which is effective to cause the die ring 37 to be shifted until the feedback signal from transducer 44 nulls out the command signal received from the electric programmer. Thus, the system shown in FIG. 8 is effective to vary the overall thickness of the bottle wall by controlled movements of mandrel 36 and to vary the thickness of an individual portion of the wall asymmetrically by lateral movement of ring 37.

From the above description of the general principles of the present invention and the above description of two preferred embodiments, those skilled in the art will readily comprehend various modifications to which the present invention is susceptible. Therefore, I desire to be limited only by the scope of the following claims.

Having described my invention, I claim:

1. A control system for an extruder of the type effective to extrude a parison, said extruder including a die with an opening therein, a mandrel disposed within said opening, the mandrel and die being shiftable relative to one another to cause a change in the thickness of the extruded parison during the parison extrusion cycle, drive means for effecting relative movement between said die and mandrel, an electronic programmer, a servo amplifier for energizing said drive means in accordance with signals received from said electronic programmer, a transducer for providing an electric signal to said servo amplifier correlated with the relative position of said die and mandrel, said electronic programmer including a set of conductors, each of the conductors of said set having a unique electrical characteristic associated therewith, means for selectively establishing the electrical characteristic associated with each of said conductors, an electronic clock effective to produce periodic output signals at predetermined time intervals, means for initiating operation of said clock in correlation with initiation of the parison extrusion cycle, electronic switching means actuated by the output signals from said clock, said electronic switching means being effective to sequentially sample the electrical characteristics of each of the conductors of said set and to apply signals to said servo amplifier correlated therewith, said electronic switching means being effective to sample the electrical characteristics of the first of said conductors at the start of the parison extrusion cycle and being effective to sample the last of the conductors at the end of the parison extrusion cycle.

2. A control system for an extruder of the type effective to extrude a parison, said extruder including a die with an opening therein, a mandrel disposed within said opening, the mandrel and die being shiftable relative to one another to cause a change in the thickness of the extruded parison during the parison extrusion cycle, drive means for effecting relative movement between said die and mandrel, an electronic programmer, a servo amplifier for energizing said drive means in accordance with signals received from said electronic programmer, a transducer for providing an electric signal to said servo amplifier correlated with the relative position of said die and mandrel, said electronic programmer including a set of conductors, each of the conductors of said set having a unique characteristic potential thereon, means for selectively establishing the potential on each of said set of conductors, an electronic clock effective to produce periodic output signals at predetermined time intervals, means for initiating operation of said clock in correlation with initiation of the parison extrusion cycle, electronic switching means actuated by the output signals from said clock, said electronic switching means being effective to sequentially sample the voltages of each of the conductors of said set and to apply signals to said servo amplifier correlated therewith, said electronic switching means being effective to sample the electrical characteristics of the first of said conductors at the start of the parison extrusion cycle and being effective to sample the last of the conductors at the end of the parison extrusion cycle.

3. A control system according to claim 2 wherein said electronic switching means comprises, a shift register triggered by said clock, said shift register comprising a set of bit positions each corresponding to a respective one of said conductors of said second set, a set of electronic switching elements each connected between a different one of said set of conductors and said servo amplifier and each responsive to the presence of a bit in the corresponding bit position of said shift register to connect said conductor and to apply a signal correlated therewith to said servo amplifier.

4. A control system according to claim 3 further comprising, means connecting said shift register in circular form, means to set a bit in the bit position of said shift register associated with the first conductor of the set, means to cause said bit to advance progressively through said bit positions of said shift register to sequentially apply the voltage on said conductors to said servo amplifier.

5. A control system according to claim 2 wherein said switching means comprises, a set of high impedance switching circuits each including a different one of said conductors and said servo amplifier.

6. A control system according to claim 5 wherein each of said high impedance switching circuits include a field effect transistor.

7. A control system according to claim 2 further comprising, a voltage divider having a set of intermediate points each connected to one of the conductors of a second set to impress said unique characteristic potential thereon, and means for selectively interconnecting each of said second set of conductors with one of said first set of conductors.

8. A control system according to claim 7 wherein said set of intermediate points impresses equally spaced characteristic potentials on said second set of conductors.

9. A control system according to claim 7 wherein said switching means comprises, a set of high impedance switching circuits each connected to a different one of said conductors wherein the voltages on said voltage divider are not materially altered by the switching of switching circuits.

10. A control system according to claim 2 further comprising, settable control means for modifying the signal of said electronic programmer, said servo amplifier energizing said drive means in accordance with the signal from said electronic programmer as modified by said control means.

11. A control system according to claim 10 for a plurality of extruders, further comprising, a second drive means for effecting relative movement between a second die and mandrel, a second servo amplifier energizing said second drive means in accordance with the signal received from said electronic programmer, a second transducer for providing an electronic feedback signal to said second servo amplifier correlated with the position of said second die and mandrel, and said control means being settable to provide means to control plural extruders to produce identical articles despite variations in said extruders.

12. A control system according to claim 2 further comprising, settable control means, said servo amplifier for energizing said drive means in accordance with the algebraic sum of signals received from said electronic programmer and said settable control means.

13. A control system according to claim 2 wherein, said electronic clock emits said periodic output signals at equal time intervals, the operating cycle of said extruder is an integral multiple of the said equal time intervals between periodic signals of said electronic clock, and means for varying the length of said time intervals.

14. A control system for an extruder of the type effective to extrude a parison, said extruder including a die with an opening therein, a mandrel disposed within said opening, the mandrel and die being shiftable relative to one another to cause a change in the wall thickness of the extruded parison, and drive means for effecting relative movement between said die and mandrel, an electronic programmer;

a servo amplifier for energizing said drive means in accordance with signals received from said electronic programmer;

a transducer for providing an electric feedback signal to said servo amplifier correlated with the relative position of said die and mandrel;

a circuit for applying signals to said servo amplifier in accordance with the impedance in said circuit;

said electronic programmer including a matrix consisting of first and second sets of conductors;

each of the conductors of said first set having a unique characterizing impedance associated therewith;

means for selectively interconnecting each of said second set of conductors with one of said first set of conductors;

an electronic clock effective to produce periodic output signals at predetermined time intervals;

means for initiating operation of said clock in correlation with initiation of the parison extrusion cycle;

electronic switching means actuated by the output signals from said clock;

said electronic switching means being effective to sequentially select each of the leads of said second set to connect the impedance associated therewith to said circuit;

said electronic switching means being effective to select the first of said leads at the start of the extrusion cycle and being effective to select the last of the leads at the end of the extrusion cycle.

15. A control system according to claim 14 wherein said electronic switching means comprises, a shift register triggered by said clock output signals, said shift register comprising a set of bit positions each corresponding to a respective one of said conductors of said second set, a set of electronic switching elements each connected in series with a different one of said leads of said second set of conductors and each responsive to the presence of a bit in the corresponding bit position of said shift register to select said leads.

16. A control system according to claim 15 further comprising, means connecting said shift register in circular form, means for setting a bit in the bit position of said shift register associated with the first conductor of said second set, means to cause said bit to advance progressively through said bit positions of said shift register.

17. A control system according to claim 14 wherein said circuit comprises, a constant current source, and said characterizing impedances being selectively connectable by the actuation of said switching means in series with said source.

18. A control system according to claim 17 wherein said circuit further comprises an amplifier connected across said impedances and in series with said source for applying said signals to said servo in accordance with the voltage across said impedances.

19. A control system according to claim 14 further comprising:

a set of resistors connected in series, resistors of said set being connected between pairs of conductors of said first set to associate said unique characterizing impedances therewith.

20. A control system according to claim 19 wherein said characterizing impedances on said first set of conductors are a series of impedances equally spaced in value.

21. A control system according to claim 19 wherein said switching means comprises, a set of solid state switches each connected between a different one of said conductors of said second set and said circuit to selectively connect said impedances into said circuit.

22. A control system according to claim 17 further comprising:

settable control means for modifying the current of said source, to alter the relation of the signal from said circuit to the impedances of said circuit.

23. A control system according to claim 22 for a plurality of extruders, further comprising a second drive means for effecting relative movement between a second die and mandrel, a second servo amplifier energizing said second drive means in accordance with the signal received from said electronic programmer, a second transducer for providing an electronic feedback signal to said second servo amplifier correlated with the position of said second die and mandrel, and said control means being settable to provide means to control plural extruders to produce identical articles despite variations in said extruders.

24. A control system according to claim 14 further comprising,
   settable control means,
   said servo amplifier being operative to energize said drive means in accordance with the algebraic sum of signals received from said electronic programmer and said settable control means.

25. A control system according to claim 14 wherein,
   said electronic clock emits said periodic output signals at equal time intervals,
   the operating cycle of said extruder is an integral multiple of the equal time intervals between periodic signals of said electronic clock, and
   means for varying the length of said time intervals.

26. The control system of claim 14 further comprising means for controlling auxiliary machine functions in timed relationship to the cycle of operation of said extruder,
   said means for controlling auxiliary machine functions comprising,
   electrically responsive actuator means for controlling said auxiliary machine functions,
   an auxiliary patch panel including a matrix consisting of first and second sets of conductors,
   each of the conductors of said first set being interconnected to one of said actuators,
   means for selectively interconnecting each of said second set of conductors with one of said first set of conductors,
   said electronic switching means being effective to sequentially apply a voltage to each of the leads of said second set of said auxiliary patch panel.

27. The control system of claim 14 further including means for producing an asymmetric change of thickness of said tube, said last named means comprising,
   second drive means for effecting relative transverse movement between said die and said mandrel,
   a second electronic programmer,
   a second servo amplifier for energizing said drive means in accordance with signals received from said electronic programmer,
   a second transducer for providing an electric feedback signal to said servo amplifier correlated with the relative position of said mandrel and die member.

28. A control system for an extruder of the type effective to extrude a parison, said extruder including a die with an opening therein, a mandrel disposed within said opening, the mandrel and die being shiftable relative to one another transversely of the axis of said mandrel to cause an asymmetric change in the thickness of the extruded parison, wherein one portion of the parison wall is thicker than the opposite portion;
   drive means for effecting relative transverse movement between said die and mandrel;
   an electronic programmer;
   a servo amplifier for energizing said drive means in accordance with signals received from said electronic programmer;
   a transducer for providing an electric feedback signal to said servo amplifier correlated with the relative position of said mandrel and die member;
   said electronic programmer including a matrix consisting of first and second sets of conductors;
   each of the conductors of said first set having a unique electrical characteristic associated therewith;
   means for selectively interconnecting each of said second set of conductors with one of said first set of conductors;
   an electronic clock effective to produce periodic output signals at predetermined equal time intervals;
   means for initiating operation of said clock in correlation with initiation of the parison extrusion cycle;
   electronic switching means actuated by the output signals from said clock;
   said electronic switching means being effective to sequentially sample the electrical characteristics of each of the leads of said second set and to apply signals to said servo amplifier correlated therewith;
   said electronic switching means being effective to sample the electrical characteristics of the first of said leads at the start of the parison extrusion cycle and being effective to sample the last of the leads at the end of the parison extrusion cycle.

29. The control system of claim 28 in which said die is shiftable from a position in which the opening is concentric with said mandrel to a position in which the opening is eccentric with respect to the mandrel and said drive means is interconnected to said die.

30. A control system for an extruder of the type effective to extrude a parison, said extruder including a die with an opening therein, a mandrel disposed within said opening, the mandrel and die being shiftable relative to one another to cause a change in the thickness of the extruded parison during the parison extrusion cycle,
   drive means for effecting relative movement between said die and mandrel,
   an electronic programmer operable through a control cycle,
   a servo amplifier for energizing said drive means in accordance with signals received from said electronic programmer,
   a transducer for providing an electric signal to said servo amplifier correlated with the relative position of said die and mandrel,
   said electronic programmer including a set of conductors,
   each of the conductors of said set having a unique electrical characteristic associated therewith,
   means for selectively establishing the electrical characteristic associated with each of said conductors,
   a control for effecting the total length of said control cycle, whereby said length can be matched to the length of the parison extrusion cycle,
   an electronic pulse generator effective to produce signals at predetermined intervals throughout said control cycle,
   means for automatically electrically dividing said control cycle into said predetermined number of intervals,
   means for initiating operation of said pulse generator to initiate said control cycle in correlation with initiation of the parison extrusion cycle, electronic switching means actuated by the output signals from said pulse generator, said electronic switching means being effective to sequentially sample the electrical characteristics of each of the conductors of said set and to apply signals to said servo amplifier correlated therewith, said electronic switching means being effective to sample the electrical characteristics of the first of said conductors at the start of the parison extrusion cycle and being effective to sample the last of the conductors at the end of the parison extrusion cycle.

31. The control system of claim 30 in which said die is shiftable from a position in which the opening is concentric with said mandrel to a position in which the opening is eccentric with respect to the mandrel and said drive means is interconnected to said die.

32. The control system of claim 2 further including means for producing an asymmetric change of thickness of said tube, said last named means comprising, second drive means for effecting relative transverse movement between said die and said mandrel, a second electronic programmer, a second servo amplifier for energizing said drive means in accordance with signals received from said electronic programmer, a second transducer for providing an electric feedback signal to said servo amplifier correlated with the relative position of said mandrel and die member.

33. The control system of claim 2 further comprising means for controlling auxiliary machine functions in timed relationship to the cycle of operation of said extruder, said means for controlling auxiliary machine functions comprising, electrically responsive actuator means for controlling said auxiliary machine functions, an auxiliary patch panel including a matrix consisting of first and second sets of conductors, each of the conductors of said first set being interconnected to one of said actuators, means for selectively interconnecting each of said second set of conductors with one of said first set of conductors, said electronic switching means being effective to sequentially apply a voltage to each of the leads of said second set of said auxiliary patch panel.

* * * * *